May 11, 1926.
C. A. ADAMS
BERRY PROTECTOR AND PLANT MULCH
Filed Dec. 3, 1923
1,584,589
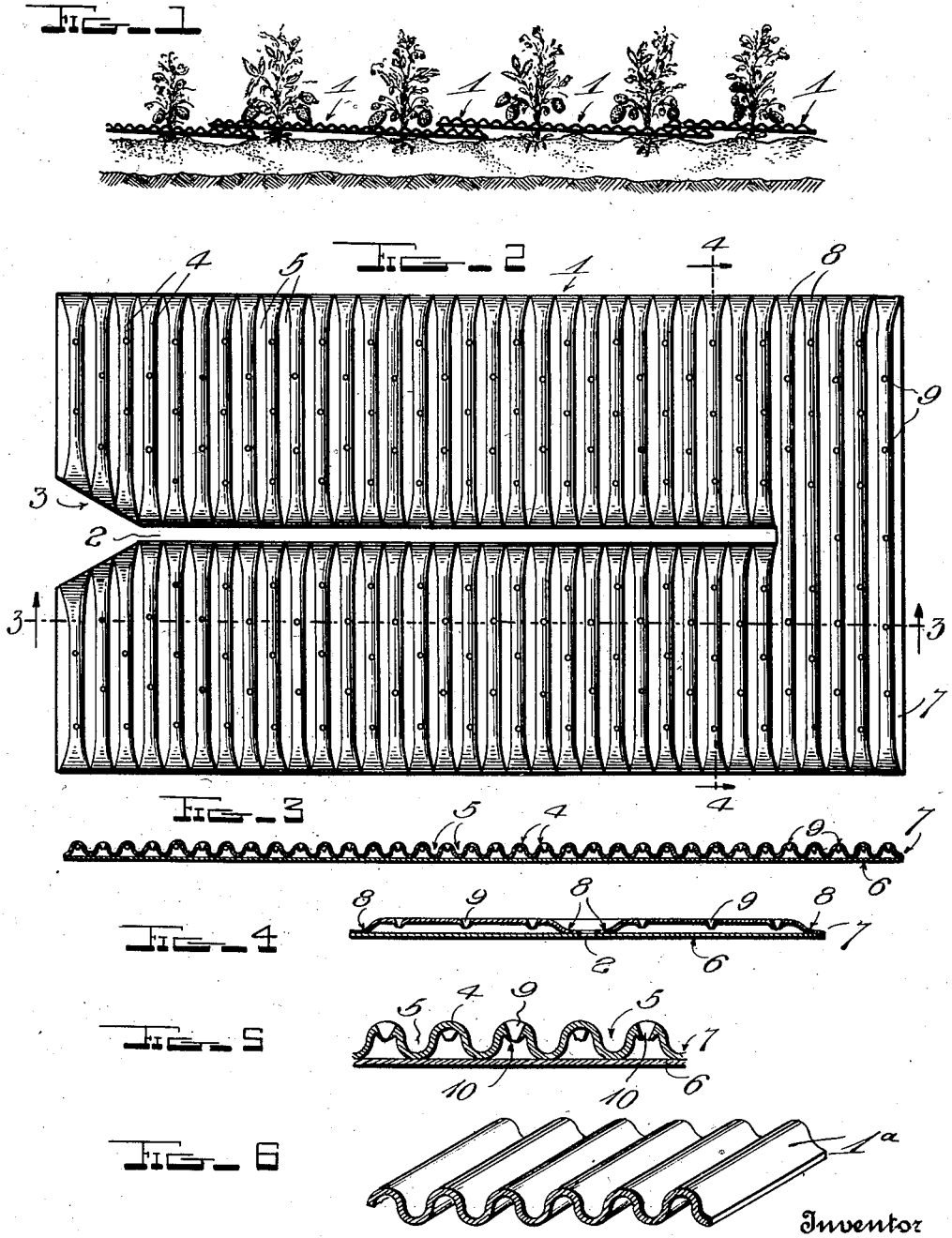

Patented May 11, 1926.

1,584,589

UNITED STATES PATENT OFFICE.

CHARLES A. ADAMS, OF ALPINE, TEXAS.

BERRY PROTECTOR AND PLANT MULCH.

Application filed December 3, 1923. Serial No. 678,270.

My invention relates to devices for supporting strawberries and the like against contact with the ground, to prevent them from becoming gritty and to prevent rotting in wet weather and forming a mulch, as well as facilitating ripening of the berries by making them readily accessible to the rays of the sun.

One object is to provide a protector which is adapted to extend longitudinally of a berry row and is capable of acting, at the same time, as a support for the berries of a plurality of plants.

Another object is to provide a protector whose upper side is provided with closely spaced berry-supporting ribs having water-draining grooves between them for rapidly carrying off rain water and preventing the berries from lying therein, with the well known harmful results.

A further object is to provide a protector which embodies insect trapping means, and in this connection, still another aim is to provide a ribbed protector of the type above mentioned, whose ribs act as insect traps.

A still further object is to provide a protector which can be, although not necessarily, made of ordinary corrugated card board, commonly known as straw board.

Still another aim is to provide an exceptionally simple and inexpensive protector, yet one which will be effective and durable and may often be repeatedly used, season after season.

A still further object of the invention is to provide a device of this character which will form a mulch for berry, cotton and other plants.

With the foregoing in view, the invention resides in the novel subject matter hereinafter described and claimed, the description being supplemented by the accompanying drawing.

Figure 1 is an elevation of a portion of a row of berry plants, showing the berries thereof supported by a plurality of the improved supports.

Figure 2 is an enlarged top plan view of one of the supports.

Figures 3 and 4 are sectional views as indicated by lines 3—3 and 4—4 of Fig. 1.

Figure 5 is an enlarged detail longitudinal sectional view.

Figure 6 is a sectional perspective view showing a different form of construction.

In the drawing above briefly described (Figs. 1 to 5), the numeral 1 designates an elongated sheet which may be formed of any desired material, said sheet being adapted to extend longitudinally of a row of berry plants and having a longitudinal slot 2 which opens through one of its ends, so that the sheet may straddle the stems of two or more plants, according to the length of the sheet. The open end of the slot 2 is by preference flared, as indicated at 3 to facilitate engagement of the sheet with the stems of the plants. As shown in Fig. 1, a plurality of the sheets are used for each row and their ends are disposed in overlapping relation, so as to form a continuous protecting surface from one end of the row to the other. This surface not only prevents the berries from coming in contact with the earth and becoming gritty and rotting in wet weather, but it prevents the plant runners from taking root between the plants and immediately along the sides of the row.

In the preferred form of construction, the upper side of the sheet 1 is formed with a plurality of closely spaced ribs 4 which by preference extend transversely of said sheet, although they might in some instances extend longitudinally. These ribs support the berries and define grooves 5 which serve to rapidly carry off rain water so that the berries cannot lie therein, with danger of rotting or becoming otherwise harmfully affected.

I prefer to embody insect-trapping means in the protector, and the preferred manner of accomplishing this result is shown. The sheet 1 has been illustrated as constructed from ordinary corrugated card board, commonly known as straw board, and the lower ply of said sheet, designated by the numeral 6, is plain, while its upper ply 7 is corrugated to provide the ribs 4. As indicated at 8, these ribs are flattened at their ends to seal them and suitable adhesive may be used in performing the sealing operation, if desired. At spaced points, openings 9 are formed in the ribs and in so doing, some of the card board is pressed downwardly into the interior of said ribs, providing depending annular flanges 10. It will be seen that any insects crawling along the surface of the sheet may enter the ribs through the openings 9, thinking that they are merely entering the ground in the usual way. Due to the flanges 10 however, it is practically impossible for the insects to again reach the upper surface of the sheet and consequently an effective insect trap is provided.

In Fig. 6, I have illustrated a single ply of corrugated material 1ᵃ, which may be used if desired, instead of employing the straw board above described, the ribs and grooves of the sheet 1ᵃ having the same functions as the corresponding ribs and grooves above described. The ribs however are not provided with any perforations, although they might be used if desired.

It will be seen from the foregoing that an exceptionally simple and inexpensive, yet a highly advantageous device has been provided for protecting berries against contact with the earth, for preventing the berries from lying in rain water and rotting, for trapping any insects around the bases of the plants, for preventing the plant runners from taking root, at undesirable points, and for generally expediting the production of first grade berries.

As excellent results are obtainable from the details disclosed, they are preferably followed, but within the scope of the invention as claimed, numerous changes may be made. For instance, the use of berry-supporting ribs and water-draining grooves, is not restricted to a sheet of the shape and proportions shown in the drawing, nor is the insect-trapping means restricted to a sheet of any particular form, except as restricted by the manner of claiming the invention.

I claim:

1. A berry protector comprising a sheet adapted to support the berries of a plurality of berry plants against contact with the ground, said sheet being elongated to extend longitudinally of a row of plants and having a single longitudinal slot opening through one of its ends to receive the stems of all plants protected by the sheet.

2. A berry protector comprising a transversely ribbed sheet adapted to support the berries of a plurality of berry plants against contact with the ground, said sheet being elongated to extend longitudinally of a row of plants and having a single longitudinal slot opening though one end to receive the stems of all plants protected by the sheet.

3. A berry protector comprising a sheet adapted to support the berries of a plurality of berry plants against contact with the ground, said sheet being elongated to extend longitudinally of a row of plants and having a single longitudinal slot opening through one end to receive the stems of all the plants protected by the sheet, and spaced, transversely disposed berry supporting ribs on the upper side of said sheet and on the opposite sides of said slot, said ribs forming water conducting channels between themselves.

In testimony whereof I have hereunto affixed my signature.

CHARLES A. ADAMS.